Patented Apr. 26, 1949

2,468,054

UNITED STATES PATENT OFFICE 2,468,054

COPOLYMERS OF VINYLIDENE FLUORIDE WITH ETHYLENE AND HALOGENATED ETHYLENES

Thomas A. Ford, Wilmington, Del., assignor to E. I. du Pont de Nemours & Company, Wilmington, Del., a corporation of Delaware No Drawing. Application February 28, 1944, Serial No. 524,300

15 Claims. (Cl. 260—86)

This invention relates to new polymeric materials comprising vinylidene fluoride and to methods for obtaining them.

Vinylidene fluoride has long been regarded as a nonpolymerizable compound. For example, Swarts (Bull. Acad. Roy. Belgique, 39, 383–414 (1901)) found that vinylidene fluoride was not polymerized by the prolonged action of sunlight, either when liquefied or when as a gas mixed with oxygen. On the other hand, the other vinylidene halides, such as vinylidene chloride, vinylidene chlorobromide, and vinylidene bromide, behave quite differently. They polymerize spontaneously when kept under ordinary pressures and temperatures, even in the absence of light and without added catalysts.

This invention has as an object the production of new and useful high molecular weight polymers. A further object is a polymer of this kind which is composed in substantial amount of vinylidene fluoride and which possesses a valuable combination of physical and chemical properties.

The above objects are accomplished in the manner more fully described hereinafter by the interpolymerization of vinylidene fluoride with ethylene or a halogenated ethylene under superatmospheric pressure above 10 atmospheres in the presence of a polymerization catalyst.

I have found that when vinylidene fluoride is polymerized with ethylene or with a halogenated ethylene, in the manner indicated above, polymers are obtained which are of unusual toughness and thermal stability and which are of especial value in the manufacture of shaped or molded articles and of durable coating compositions. Among the most useful catalysts for the present purpose are the peroxygen compounds.

Generally, in practicing this invention a pressure vessel provided with means for heating and agitating the reactants, and capable of withstanding pressures of at least 1000 atmospheres is charged with the catalyst and monomer or monomers. Additional quantities of any of the reactants may be added thereafter by injection through a suitable system of valves and connectors. The reaction system is advantageously provided with means for controlling and recording the internal temperature and pressure, and a safety device, such as a rupture disc, to ensure that the safe operating pressure of the equipment is not exceeded. The use of an inert liquid medium to aid in dispersing the catalyst and in controlling the reaction by dissipating the liberated heat is recommended, and water has many special advantages as a dispersion medium.

In one method of operation the reactor is charged, before closing, with water sufficient to occupy one-fourth to three-fourths of the internal volume, a catalyst such as benzoyl peroxide in a proportion of 0.05 to 5%, based on the total quantity of monomers which is to be added, and any other reaction ingredients such as promoters, modifiers, buffers, and dispersing agents. The monomer to be polymerized with the vinylidene fluoride is usually added just prior to closing the reactor unless it is a low-boiling liquid or gas, in which case the reactor is closed, the air or nitrogen in the reactor is evacuated, and the monomer is added through a valve by means of pressure. The vinylidene fluoride is then charged as a gas under pressure through the inlet connection. Oxygen generally has an undesirable effect both on the rate of polymerization and on the properties of the polymerization product. Hence the oxygen content of the water and of the monomers employed should be reduced to a practical minimum, and care should be taken throughout the charging operations to exclude oxygen. The reactor may be swept with oxygen-free nitrogen and loaded under a blanket of nitrogen. After closing the reactor, the gas is preferably removed by evacuating the contents of the reactor to constant pressure before admitting the vinylidene fluoride or gaseous copolymer ingredients. The reactor is then heated to a temperature of 50° to 150° C. An additional quantity of vinylidene fluoride or of the other monomer is then admitted to the reactor to raise the pressure to the desired range. An inert liquid such as water can also be employed to apply the necessary pressure. A pressure of 500 to 1000 atmospheres at about 80° C. is preferred. The start of the polymerization is evidenced by a drop in pressure within the reactor, and additional quantities of the desired liquid or gaseous reaction component are injected from time to time to maintain the pressure within the desired range. As the catalyst is used up, the reaction rate diminishes, and when it becomes unprofitably low the reactor is cooled, the excess pressure is released, and the vessel is opened and discharged. The vinylidene fluoride copolymer is obtained from the reactor in the form of a powder or porous cake.

In another mode of operation, the reactor is swept with oxygen-free nitrogen, closed, and evacuated, and an aqueous solution of the catalyst and other water-soluble reaction ingredients are admitted before charging the monomers.

For example, a dilute solution of an inorganic persulfate catalyst, e. g., ammonium persulfate, is admitted, followed by an aqueous solution of an oxidizable sulfoxy compound, e. g., sodium bisulfite. The vinylidene fluoride and copolymer ingredient are then introduced successively or as a mixture. With this catalyst system the preferred temperatures and pressures are not as high as in the case of the organic peroxide-catalyzed polymerization, and a temperature of about 40° C. and a pressure of about 50 atmospheres is highly satisfactory.

The polymeric product obtained from the reactor in powder, granular or solid form may, if desired, be washed with water or other solvents or solution for the removal of catalyst residues, etc., and is dried by ordinary techniques.

The polymers of this invention containing from 5% to 95% of vinylidene fluoride and from 95% to 5% of the other polymer components, based on the weight of the two ingredients, are preferred. These polymers are thermoplastic at temperatures in the range of 100° to 320° C. The particular temperature in any one instance depends upon the composition of the polymer and the nature of the material interpolymerized with the vinylidene fluoride.

The polymers obtained as described herein are soluble in a rather wide range of solvents, and by polymerization with ethylene in relatively high proportions, vinylidene fluoride polymers which are soluble in xylene, toluene, etc., are obtained. The halogenated ethylenes, and particularly the fluorinated ethylenes are further valuable as copolymer components for vinylidene fluoride, because of their high flame resistance. Other valuable properties of the new polymeric materials disclosed herein will become apparent from the following examples in which the parts are given by weight.

*Example I*

This example illustrates the formation of a vinylidene fluoride/ethylene polymer. In this polymerization the ethylene is more rapidly consumed than the vinylidene fluoride and is added to the mixture of monomers during the polymerization.

A stainless steel, high-pressure reactor is charged with 25 parts of water, 0.1 part of benzoyl peroxide, and 20 parts of vinylidene fluoride. Ethylene is then admitted to give a total pressure of 450 atmospheres at room temperature, and agitation and heating are begun. At the reaction temperature, 80° C., the pressure is maintained within the range of 605 to 700 atmospheres by injection of additional ethylene through a valve from a high-pressure storage source containing purified ethylene of less than 20 P. P. M. oxygen content. When the reaction is complete, as indicated by the cessation of pressure drop, the reactor is cooled, the excess pressure is relieved, and the product is discharged. The white powder, which is washed with water and dried in vacuum, is a copolymer of vinylidene fluoride and ethylene. It contains 5.11% fluorine; hence the polymer corresponds to one having 8.6% vinylidene fluoride by weight. The polymer can be pressed at 140° C. into clear, colorless films which are tough and impervious to water.

*Example II*

The following example illustrates the polymerization of vinylidene fluoride with vinyl fluoride.

A stainless steel, high-pressure reactor is charged as in Example I with 25 parts of water, 0.1 part of benzoyl peroxide, 20 parts of vinylidene fluoride, and 30 parts of vinyl fluoride. At 78° to 81° C. the pressure is maintained within the range 840 to 975 atmospheres by injection of water. In 5.75 hours the total of the individual pressure drops is 555 atmospheres and the reaction is then essentially complete as indicated by the cessation of pressure drop. The reactor is cooled and discharged, and the vinylidene fluoride/vinyl fluoride polymer (10 parts) is washed with water and dried in vacuum. It contains 43.45% fluorine, which corresponds to about 10% vinylidene fluoride content by weight. It can be pressed at 200° C. to a transparent film which is stiff and tough and has a sticking temperature of 160° to 164° C. The pressed film is not degraded by heating at 200° C. for 5 min.

*Example III*

This example illustrates the copolymerization of vinylidene fluoride with tetrafluoroethylene. A silver-lined high-pressure reactor is swept with oxygen-free nitrogen, closed, and evacuated. A solution of 0.5 part of ammonium persulfate in 100 parts of deoxygenated water is then admitted, followed by a solution of 0.4 part of sodium bisulfite in 100 parts of water. The reactor is cooled, and 40 parts of tetrafluoroethylene and 2 parts of vinylidene fluoride are admitted. The reaction vessel is agitated and heated to a temperature of 40° C., which is maintained for 8.25 hours. It is then cooled, opened, and the contents removed. The polymer is obtained as a white powder containing 74.46% fluorine which corresponds to a composition of 9.3% $C_2H_2F_2$–90.7% $C_2F_4$, which corresponds to a molar ratio of vinylidene fluoride: tetrafluorethylene of 1:7.

The vinylidene fluoride-tetrafluoroethylene polymer can be pressed into nonflammable films which are not discolored by heating between aluminum foils at 300° C. for 5 minutes.

The halogenated ethylenes which can be polymerized with the vinylidene fluoride comprise vinylidene chloride, vinyl chloride, vinyl bromide, difluorochlorethylene, trifluorochlorethylene, tetrafluoroethylene, vinyl fluoride, 1-chloro-1-fluoroethylene, etc. The halogenated ethylenes containing at least one fluorine atom are particularly desirable because of the unusually high resistance of the polymer to degradation in conjunction with other valuable physical properties.

Multicomponent polymers prepared by polymerizing vinylidene fluoride in conjunction with more than one compound selected from the class of ethylene and halogenated ethylenes have valuable properties and are often prepared with even greater ease than the polymers of vinylidene fluoride with a single polymer component.

A wide variety of polymerization catalysts can be used to bring about the reaction. Especially suitable are oxygen and peroxy compounds, i. e., compounds containing the peroxy linkage —O—O—. Examples are the diacyl peroxides, e. g., dibenzoyl peroxide, benzoylacetyl peroxide, and dipropionyl peroxide; alkyl peroxides, e. g., diethyl peroxide tertiary butyl hydroperoxide and dipropyl peroxide; hydrogen peroxide; inorganic peroxides, e. g., barium peroxide, magnesium peroxide, and zinc peroxide, which are especially effective if used in conjunction with an anhydride of an organic acid; and peroxygen acids and their salts, e. g., persulfuric acid, ammonium persulfate, potassium persulfate, potassium percarbonate, potassium perphosphate, and sodium perborate. Other polymerization catalysts which can be employed include hydrazine salts, e. g., hydrazine sulfate and hydrazine sebacate, amine oxides, e. g., trimethylamine oxide; and organometallic compounds, e. g., lead tetraethyl, lead tetraphenyl, lithium butyl, silver acetylide, etc.

The catalyst should be employed in an amount in excess of 0.005% (based on the total weight of monomers) of benzoyl peroxide or of its molecular equivalent of another catalyst, and preferably there is employed between 0.05% and 2%, and not more than 5%, of the catalyst. Although oxygen in amounts of 100 to 5000 P. P. M., based on the weight of monomers, can be used as a catalyst, less than 1000 P. P. M. of oxygen are preferred as larger amounts usually have a deleterious effect on the polymerization and on the properties of the polymers. With some polymer ingredients, light or heat alone are sufficient to catalyze the polmerization.

Promoters, although not necessary, may be used in conjunction with the catalyst to increase yield or to decrease the required time of reaction. Reducing agents, and especially oxidizable sulfoxy compounds are suitable promoters. For example, sodium bisulfite, ammonium bisulfite, sodium hydrosulfite, sodium thiosulfate, p-toluene-sulfinic acid, formamidine sulfinic acid, condensation products of aldehydes with alkali metal bisulfites or hydrosulfites, dialkyl sulfites, etc. Such compounds can be employed in amounts ranging from 0.001% to 5% based on the weight of monomer to facilitate the polymerization. Other promoters which are useful in connection with certain polymer systems include sulfur dioxide; acetylenic alcohols, e. g., propargyl alcohol; and metal carbonyls, e. g., iron carbonyl; etc.

By an "oxidizable sulfoxy compound" is meant sulfur dioxide, and compounds which contain a sulfur-oxygen linkage and which yield sulfur dioxide when treated with hydrochloric acid.

The optimum pressures and temperatures depend to a large extent on the catalyst or combination of catalysts employed. In general, pressures in the range of 10 to 1000 atmospheres are employed, the upper limit being restricted only by the equipment available. In any given system the effect of using a higher pressure during polymerization is to increase the molecular weight of the polymer. With sufficiently active catalysts, such as a mixture of persulfate and bisulfite, the more valuable orientable copolymers can be obtained in either bulk or aqueous systems, at pressures of from 10 to 50 atmospheres. In the case of less active catalysts, such as benzoyl peroxide alone pressures of 500 to 1000 atmospheres are preferred. The use of organic solvents, or liquid polymer ingredients in the reaction system, generally permit the use of lower pressures in preparing the higher molecular weight products. Polymer ingredients which are not liquefiable at the reaction temperature (e. g. ethylene) generally require pressures in the range of 100 to 1000 atmospheres, while the lower pressures can be used with liquid polymer ingredients.

The orientable polymers obtainable by the practice of this invention are by cold working, e. g., cold drawing or cold rolling, permanently elongated to an increase in length of at least 100% and up to 400% or more of the original length. The resulting product thus exhibits molecular orientation in the direction of the elongation and greatly increased tensile strength and elasticity. These polymers can be formed by extrusion or otherwise into continuous filaments or fibers.

The temperature is adjusted to give a controllable rate of reaction, and the optimum temperature depends to a large extent on the catalyst employed. In general, the temperature range is from 20° C. to 250° C. with 30° to 150° C. preferred. With systems comprising oxygen-liberating catalysts activated by the presence of oxidizable sulfoxy compounds (e. g., persulfate-bisulfite) temperatures of 30° to 125° C. are most suitable. Organic peroxides, e. g., diethyl peroxide and dibenzoyl peroxide, operate best in the range 50° to 150° C., while the other catalysts such as oxygen, hydrazine salts, etc., generally are preferably employed at temperatures of 100° to 250° C.

A liquid polymerization medium, although not necessary, is beneficial when the monomer to be polymerized with the vinylidene fluoride is also a gas, since it aids in dispersing the catalyst and in controlling the reaction temperature by dissipating the liberated heat. Even with monomers which are not gaseous, an inert liquid diluent or dispersing medium is usually advantageous, and water is especially useful for this purpose. With aqueous media, buffers or dispersing agents may be employed. Soaps, alkane sulfonic acids or their salts, sodium alkyl sulfates, quaternary ammonium salts containing a long hydrocarbon chain, alkyl betaines, long-chain primary alcohols, polyvinyl alcohol, etc., may be used in this connection.

Inert organic liquid media can be used instead of water, e. g., petroleum ether, benzene, or tert.-butyl alcohol. Many organic compounds react with the growing polymer chain through a process known as telomerization, and by using such modifiers as carbon tetrachloride, bromoform, chloroform, etc., with or without inert diluents, it is possible to modify the properties of the polymers and even to obtain radically different products of relatively low molecular weight (telomers). The degree of modification depends partly upon the nature of the modifier and medium used, and partly upon the reaction conditions, e. g., relative concentration of modifier chosen. Oxygenated solvents, e. g., acetone, dioxane and methyl formate, give a very slight degree of modification as compared with the halogenated solvents, e. g., carbon tetrachloride.

The vinylidene fluoride and other polymerization ingredients employed should be reasonably pure and substantially free of oxygen. The apparatus must be constructed of materials capable of withstanding the pressure employed, and the polymerization chamber may be lined with any material, such as mild steel, stainless steel, silver, nickel, lead, aluminum, tantalum, platinum, palladium, beryllium, chromium, glass, porcelain, or enamel, which will not adversely affect the rate of polymerization or the quality of the product. The reactor is preferably equipped with some means for providing agitation.

The polymerization reaction can be carried out either batchwise or as a semi-continuous or continuous process. One or more of the reactants can be added portionwise or continuously during the polymerization and the reactor can be discharged at intervals. One mode of operation comprises passing continuously a mixture of the reactants through a zone which is maintained at reaction conditions, and which is provided with baffles, stirrers, or other means of agitation. Continuous operation possesses many technical advantages, such as speed and economy of operation, accurate control of the reaction and of the proportions of reactants, and flexibility of operation.

The polymers described herein of vinylidene fluoride with ethylene or halogenated ethylene are adapted to a wide variety of uses because of their excellent combination of toughness and high thermal stability. For example, they can be shaped under elevated temperatures and pressures into films, foils, sheets, ribbons, bands, molded objects such as rods, tubing and massive article, or they can be applied as a coating to fabrics, leather cellulose products, etc. In film form the products of this invention are useful as photofilm base. Polymers of vinylidene fluoride with ethylene or its mono- or dihalogen substitution products generally are more soluble in organic solvents than is polyvinylidene fluoride, and can be readily spun into fibers or cast into films. Polymers of vinylidene fluoride with the more highly halogenated ethylenes, e. g., chlorotrifluoroethylene, tetrafluoroethylene, etc., have generally decreased solubility and also great resistance to heat combined with inertness, which makes them especially suitable for applications such as in coatings and insulating materials for use under severe environmental conditions. These vinylidene fluoride polymers can be used alone, or they can be mixed with or prepared in the presence of other ingredients such as cellulose derivatives, resins, plasticizers, stabilizers, modifiers, pigments, filling materials, dyes, etc.

As many apparently widely different embodiments of this invention may be made without departing from the spirit and scope thereof, it is to be understood that I do not limit myself to the specific embodiments thereof except as defined in the appended claims.

I claim:

1. A process for obtaining polymeric products which comprises reacting a mixture consisting by weight of from 5% to 95% vinylidene fluoride and from 95% to 5% of a compound selected from the group consisting of ethylene and halogen substituted ethylenes, at a pressure in excess of 10 atmospheres and in the presence of a polymerization catalyst comprising a peroxy compound.

2. A process for obtaining polymeric products which comprises reacting a mixture consisting by weight of from 5% to 95% vinylidene fluoride and from 95% to 5% of ethylene at a pressure in excess of 10 atmospheres and in the presence of a polymerization catalyst comprising a peroxy compound.

3. A process for obtaining polymeric products which comprises reacting a mixture consisting by weight of from 5% to 95% vinylidene fluoride and from 95% to 5% of a chlorine substituted ethylene at a pressure in excess of 10 atmospheres and in the presence of a polymerization catalyst comprising a peroxy compound.

4. A process for obtaining polymeric products which comprises reacting a mixture consisting by weight of from 5% to 95% vinylidene fluoride and from 95% to 5% of a halogen substituted ethylene containing at least one fluorine atom at a pressure in excess of 10 atmospheres and in the presence of a polymerization catalyst comprising a peroxy compound.

5. A process for obtaining polymeric products which comprises reacting a mixture consisting by weight of from 5% to 95% vinylidene fluoride and from 95% to 5% of a halogen substituted ethylene other than the vinylidene fluoride at a pressure in excess of 10 atmospheres and in the presence of a polymerization catalyst comprising a peroxy compound.

6. The process set forth in claim 1 in which the pressure is from 50 to 100 atmospheres.

7. The process set forth in claim 1 in which the pressure is from 200 to 1000 atmospheres.

8. The polymerization product of a mixture consisting by weight of from 5% to 95% of vinylidene fluoride and from 95% to 5% by weight of a halogen substituted ethylene other than the vinylidene fluoride.

9. The polymerization product of a mixture consisting by weight of from 5% to 95% of vinylidene fluoride and from 95% to 5% of ethylene.

10. The polymerization product of a mixture consisting by weight of from 5% to 95% of vinylidene fluoride and from 95% to 5% of a chlorine substituted ethylene.

11. The polymerization product of a mixture consisting by weight of from 5% to 95% of vinylidene fluoride and from 95% to 5% of a halogen substituted ethylene, other than said vinylidene fluoride, which contains at least one fluorine atom.

12. A polymerization product of a mixture consisting by weight of from 5% to 95% of vinylidene fluoride and from 95% to 5% of a halogen substituted ethylene other than said vinylidene fluoride, said polymerization product being capable of being cold drawn with resulting molecular orientation along the direction of elongation.

13. An oriented polymer comprising the copolymerization product of a mixture consisting by weight of from 5% to 95% of vinylidene fluoride and from 95% to 5% by weight of ethylene.

14. An oriented polymer comprising the copolymerization product of a mixture consisting by weight of from 5% to 95% of vinylidene fluoride and from 95% to 5% by weight of a halogen substituted ethylene.

15. The polymerization product of from 5% to 95% of vinylidene fluoride and from 95 to 5% by weight of trifluorochloroethylene.

THOMAS A. FORD.

REFERENCES CITED

The following references are of record in the file of this patent:

UNITED STATES PATENTS

| Number | Name | Date |
| --- | --- | --- |
| 2,200,429 | Perrin | May 14, 1940 |
| 2,310,731 | D'Alelio | Feb. 9, 1943 |